May 11, 1926.

H. W. SWEET 1,584,252

TRANSMISSION GEARING

Original Filed Jan. 10, 1923   3 Sheets-Sheet 1

Inventor;
Henry W Sweet
By
Paum Bodell

May 11, 1926.

H. W. SWEET

TRANSMISSION GEARING

Original Filed Jan. 10, 1923   3 Sheets-Sheet 2

1,584,252

Inventor;
Henry W Sweet
By Parmo Burdell

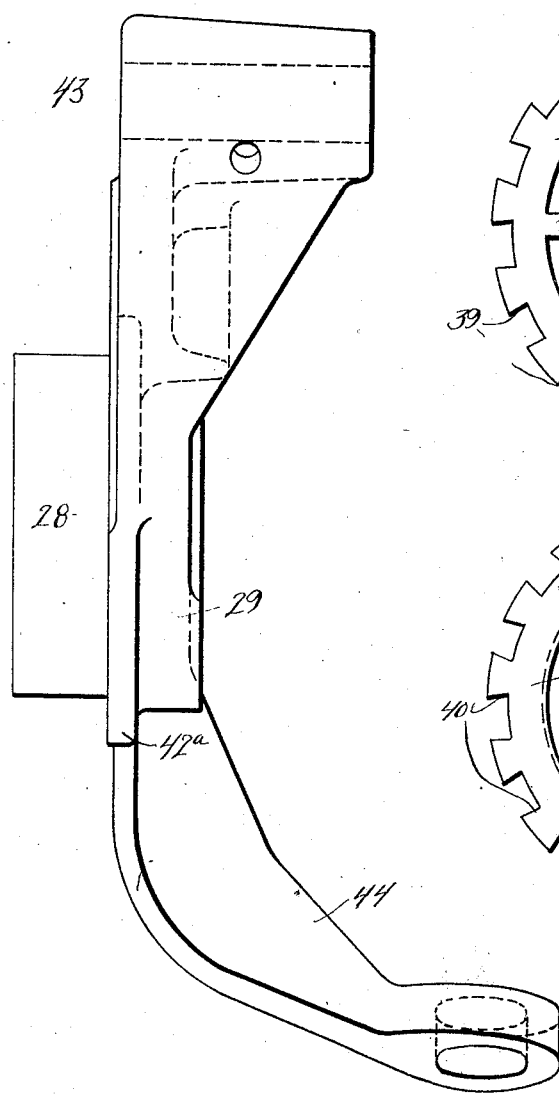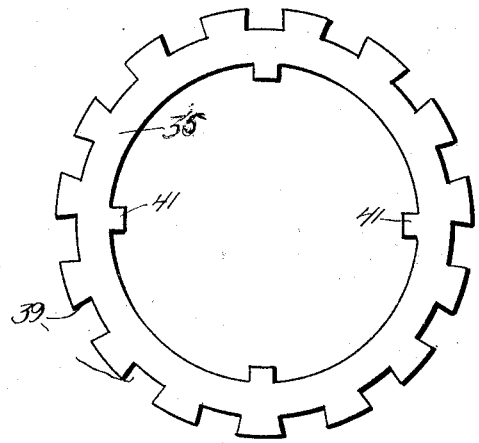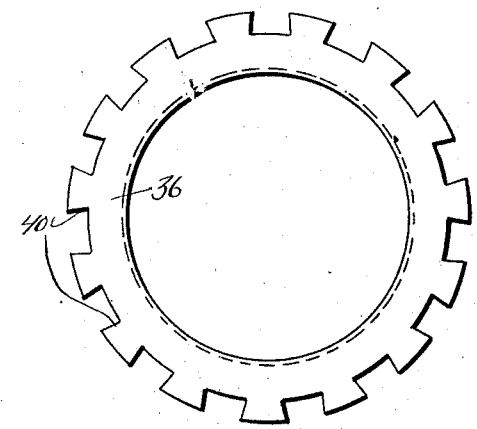

Patented May 11, 1926.

1,584,252

UNITED STATES PATENT OFFICE.

HENRY W. SWEET, OF SYRACUSE, NEW YORK, ASSIGNOR TO BROWN-LIPE GEAR COMPANY, OF SYRACUSE, NEW YORK, A CORPORATION OF NEW YORK.

TRANSMISSION GEARING.

Original application filed January 10, 1923, Serial No. 611,869. Divided and this application filed December 20, 1923. Serial No. 681,743.

This invention relates to transmission gearings, such as are used in motor vehicles and has for it object a particularly simple, efficient and durable means for supporting a brake mechanism. This application is a division of my pending application, Serial No. 611,869, filed January 10, 1923.

The invention consists in the novel features and in the combinations and constructions hereinafter set forth and claimed.

In describing this invention, reference is had to the accompanying drawings, in which like characters designate corresponding parts in all the views.

Figure 3 is a detail view of the cup-shaped member supporting the bearing adjusting means and the brake band and operating means.

Figures 4, 5 and 6 are detail views of the means for holding the bearing adjusting member in its adjusted position.

Figure 1:
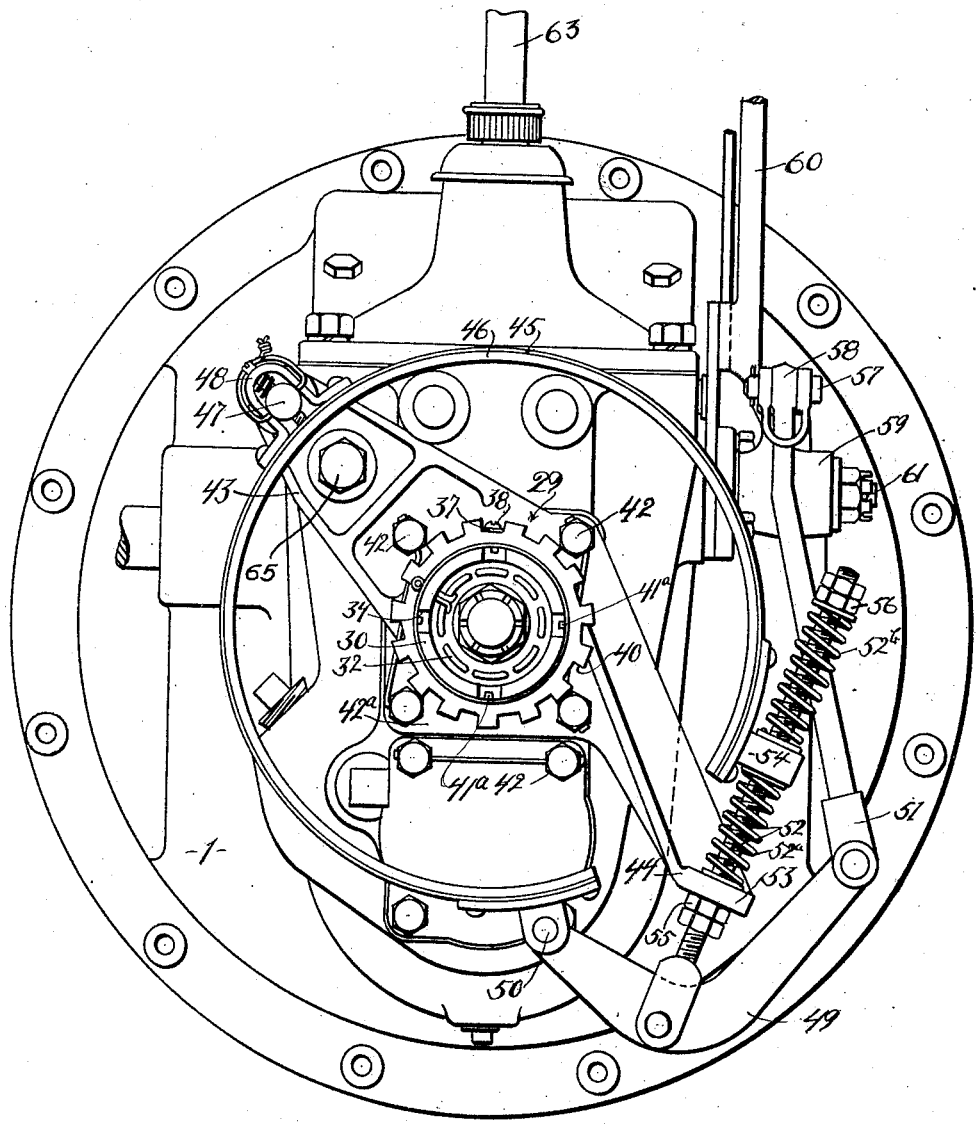
Figure 1 is an end elevation of the transmission gearing provided with my invention.

This transmission gearing includes means detachably mounted on the wall of the case concentric with the driven shaft for supporting the brake band and a portion of the operating means therefor.

1 designates the case which may be of any suitable form, size and construction.

2 and 3 are alined driving and driven shafts.

4 is a counter or jack shaft all journalled in the case.

5 designates the gear on the driving shaft 2 meshing with the gear 6 rotatable with the jack shaft 4.

7, 8 and 9 are additional gears rotatable with the jack shaft 4; these gears 6, 7, 8 and 9 being here shown as mounted upon a single hub 10. 11 and 12 are gears rotatable with the driven shaft and shiftable axially thereon in any suitable manner into and out of mesh respectively with the gear 7 and with the gears 8 and 9.

The gear 5 is formed with an external clutch face 13 and the gear 11 with an internal clutch face 14 and such gear 11 is also shiftable axially to engage the clutch faces 13 and 14. When so engaged, the driven shaft 3 is actuated directly by the driving shaft 2.

The construction and arrangement of the shafts and the gears of this gearing form no part of this invention and, as the construction and operation of this type of transmission gearing is well known, further description is thought to be unnecessary.

The driving and driven shafts 2 and 3 are mounted in oppositely disposed conical bearings located in opposite end walls of the case 1 and also the driven shaft 3 is mounted in a conical bearing located in a socket 15 in the inner end of the drive shaft 2, this bearing 16 in the socket 15 having the same inclination as the bearing 17 of the drive shaft 2; and the bearing 18 for the driven shaft having an opposite inclination to that of the bearings 16 and 17. The drive shaft 2 is connected through suitable clutch mechanism to the engine shaft, as will be understood by those skilled in the art.

Figure 2:
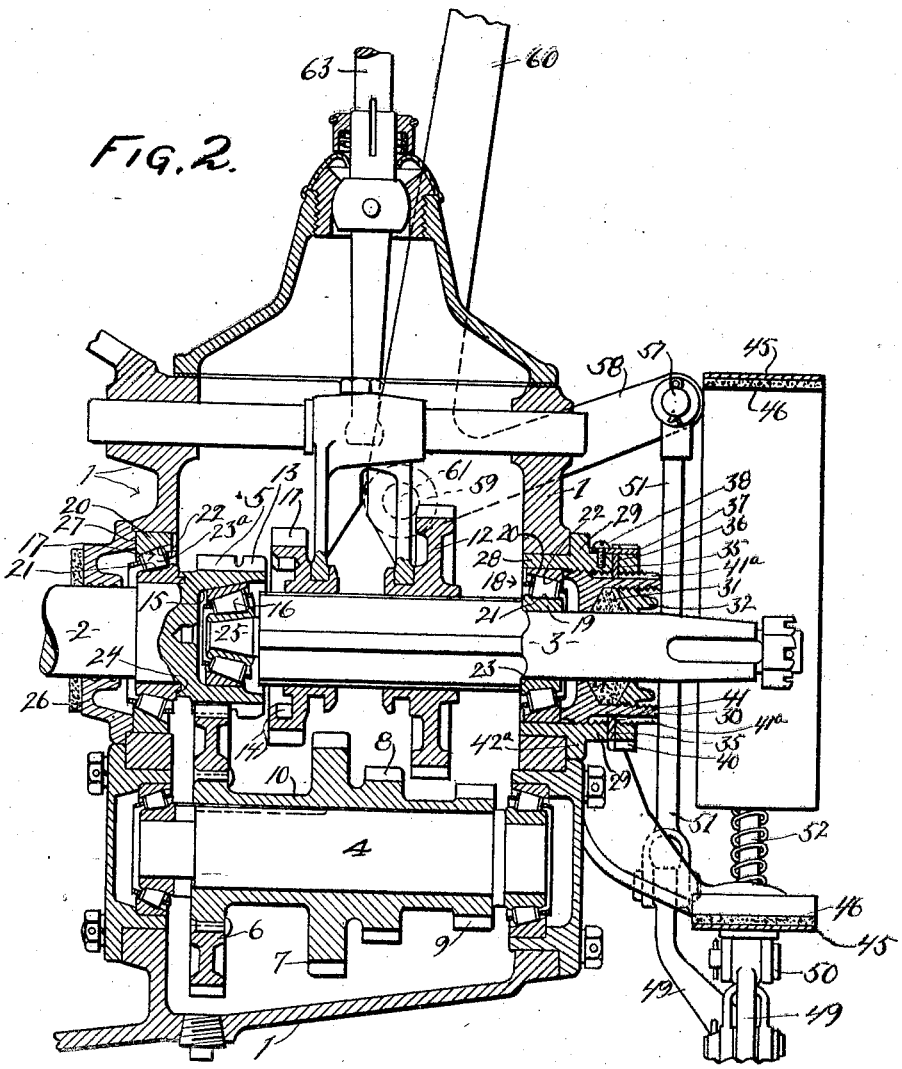
Figure 2 is a longitudinal vertical sectional view taken centrally of Fig. 1.

Each bearing 16, 17 or 18, as here illustrated, consists of inner and outer rings 19 and 20 having opposing conical faces 21 and 22 and rollers 23ª between said faces, such bearings being adjustable axially of the shaft. The driven shaft is provided with a shoulder 23 abutting against the inner edge of the inner ring 19 and likewise the driving shaft 2 is provided with a shoulder 24 abutting against the inner edge face of the inner ring of its bearing 17. The inner ring of the bearing 16 is mounted on the conical reduced portion 25 of the driven shaft 3. The conical face 21 of the inner ring of each bearing is the bottom of a groove so that the rollers are held from endwise movement relatively to the inner ring. The relative movement of the bearings 16, 17 and 18, and the shafts 2, 3 is such that axial movement of the bearing 18 inwardly thrusts the driven shaft 3 inwardly, or to the left, Fig. 2 and tightens or adjusts all of the bearings 16, 17 and 18. Hence upon adjusting movement of the bearing 18 all of such bearings will be correspondingly adjusted.

The bearing 17 is held from outward axial movement by a cap 26 on the outside of the case and having a shoulder 27 thrusting against the outer face of the outer ring of the bearing 17. This cap 26 is secured to the case in any suitable manner and is provided with an axial opening through which the driving shaft 2 extends.

The means for adjusting the bearing 18 axially is exposed on and operable from the outside of the case and is arranged concentric with the driven shaft 3 which extends through the case to the outside thereof for connection to the propeller shaft through a universal joint in any suitable manner.

In the illustrated embodiment of my invention, the bearing 18 is supported in tubular portion 28 of a hub or cup-shaped part 29, the tubular portion extending into an opening in the wall of the case, and the outer bearing ring 20 being located in such tubular portion, and the adjusting means comprises a member supported in the cup-shaped member or hub 29 and adjustable axially thereof and thrusting against the bearing 18 and preferably the outer ring 20 thereof. This adjusting member, as here illustrated, comprises a ring or plug 30 threading into the cup-shaped member 29 thrusting against the outer ring 20 of the bearing 18, such plug or ring also engaging the periphery of the shaft 3 and being here shown as carrying a packing 31 which engages the periphery of the shaft. The packing is held in position by the annular plug 32 threading into the plug 30 against the packing 31.

For the purpose of operating the adjusting member 30, it is provided at its outer edge with a plurality of notches 34 for receiving a suitable tool or wrench. Obviously, by turning the adjusting member in one direction, the bearing 18 will be thrust axially and tightened and as the bearing thrusts against the shoulder 3ª of the driven shaft 3, this shaft will be thrust axially, slightly adjusting the bearings 16 and 17.

The adjusting member 30 is held in its adjusted position by means coacting with the hub or cap 29. As here illustrated, such means comprises a flat ring or washer 35, a nut 36 threading on the adjusting member 30 against the washer and thrusting the washer against the end face of the hub or cap 29 and the locking means, as the tongue 37 fixed, as by screws 38, to the periphery of the hub or cup-shaped member 29 and extending into two alined notches 39, 40 provided in the peripheries of the washer 35 and nut 36. The washer 35 is provided with one or more internal tongues 41 which extend into lengthwise grooves 41ª formed in the adjusting member 30.

To adjust the adjusting member 30, the screws 38 are removed to detach the lock 37 and the nut 36 loosened and the member 30 turned in the cup-shaped part 29. When this adjustment is effected, the nut 36 is again tightened and the locking member 37 replaced.

The cup-shaped part or hub 29 is detachably secured to the end wall of the case and, as here shown, it is secured thereto by fastening members as screws 42 extending through openings in the flange 42ª of the hub and threading into the wall of the case, the flange 42ª lapping or abutting against the outer face of such wall.

The brake band of the transmission brake and parts of the operating means therefor are detachably supported on the transmission case and, as here illustrated, such support is carried by the hub 29 and comprises outwardly extending arms 43, 44 which extend from opposite sides of the hub in radial directions. The brake band 45 extends around the outer projecting end of the driven shaft 3 substantially concentric therewith and coacts with the brake drum not shown rotatable with the driven shaft 3. The brake band comprises the usual resilient arc-shaped band and a lining 46 which engages the brake drum. This band is supported on a laterally extending stud 47 at the end of the arm 43 and is provided with a U-shaped loop 48 extending around the stud 47, which loop is secured to the stud in any well-known manner. The brake band is operated or contracted onto the brake drum by means of the lever 49 pivoted at one end at 50 to one end of the brake band and at its other end to a link 51 which is connected to the operating lever. The lever 49 is pivoted between its ends to the endwisely movable rod 52 extending through an eye 53 in the supporting arm 44, the rod 52 also extending through an outwardly extending lug 54 at the other end of the brake band, the rod is provided with an adjustable shoulder, as a nut 55, thrusting against the lower side of the eye 53 and springs are interposed between the eye 53 and the lug 54 and between the lug 54 and adjustable shoulders or nuts 56 at the upper end of the rod.

The link 51 which is pivoted at its lower end to the lever 49 is pivoted at its upper end at 57 to an arm 58 extending from the hub 59 on the brake lever 60, the hub being pivoted at 61 to the transmission case. The brake lever extends upwardly adjacent the gear shifting lever 63. The operation of the brake band forms no part of this invention. It is obvious, however, that upon the operation or pulling rearwardly of the brake lever, the link 51 will be pushed downwardly and the end of the brake band to which the lever 49 is pivoted moved to the right, Fig. 1 and also the rod 52 pulled down, causing the spring above the lug 54, which is stronger than the spring below such lug, to pull the lug 54 and the other end of the brake band downwardly, thus contracting the brake band on the drum. When the brake lever is released, the reverse of this operation takes place and the spring below the lug 54 then expanding the brake band off the brake drum.

The brake band is detachably supported on the case by the hub or cup member 29. The arm 43 is additionally secured to the wall of the case by a suitable fastening member as a screw 65 extending through an opening therein and threading into the wall of the case.

By my invention, the brake mechanism is readily applied to the transmission case. The adjusting means for the bearings and the arrangement by which a plurality of bearings for axially alined shafts are adjusted from one point constitute the subject matter of my pending application, Sr. No. 611,869, filed January 10, 1923 of which this application is a division.

What I claim is:

In a transmission gearing, a case, a shaft journalled in the case and extending to the outside thereof, a brake band arranged substantially concentric with the shaft and a support for the brake band, said support including a hub detachably mounted on the wall of the case concentric with the shaft and supporting the bearing for the shaft, means for securing the hub to the case, the hub having radially extending arms extending in opposite directions, said arms lying against the wall of the case and secured thereto, one of said arms having a stud for supporting the brake band and means for operating the brake band, a portion of which is carried by the other arm.

In testimony whereof, I have hereunto signed my name, at Syracuse, in the county of Onondaga, and State of New York, this 3rd day of Dec. 1923.

HENRY W. SWEET.